United States Patent [19]

Schäfer et al.

[11] Patent Number: 5,418,311

[45] Date of Patent: May 23, 1995

[54] METHOD FOR THE SYNTHESIS OF POLYMERS, WHICH HAVE POLYURETHANE AND/OR POLYUREA GROUPS

[75] Inventors: Werner Schäfer; Manfred Scheiba; Heribert Seyffert, all of Essen, Germany

[73] Assignee: Th. Goldschmidt AG, Essen, Germany

[21] Appl. No.: 239,813

[22] Filed: May 9, 1994

[30] Foreign Application Priority Data

May 15, 1993 [DE] Germany ............... 43 16 321.1

[51] Int. Cl.$^6$ ............ C08G 18/08; C08G 18/32
[52] U.S. Cl. ............................ 528/60; 528/65; 528/66; 528/274; 528/275; 528/279; 528/282; 528/288; 528/480; 528/485; 528/502
[58] Field of Search ............ 528/60, 65, 66, 274, 528/275, 279, 282, 288, 480, 485, 502

[56] References Cited

U.S. PATENT DOCUMENTS 4,105,594  8/1978  Dieterich et al. .......... 521/100

*Primary Examiner*—John Kight, III
*Assistant Examiner*—Duc Truong
*Attorney, Agent, or Firm*—Anderson Kill Olick & Oshinsky

[57] ABSTRACT

Polymers, which have polyurethane and/or polyurea groups and contain finely divided fillers, are synthesized by reacting compounds, which contain at least two hydroxyl and/or amino groups, with at least difunctional isocyanates, optionally in the presence of catalysts, and mixing with suitable fillers. The compounds, containing hydroxyl and/or amino groups, and the isocyanates, are separately mixed intimately with finely divided solids so that flowable powders are obtained. The powders obtained are mixed in a stoichiometrically required amount, and the powder mixture is subjected to the action of shear forces at, if necessary, a higher temperature. The mixture of solids obtained has a shelf life of several days or weeks without reaction between the reactive compounds contained therein.

11 Claims, No Drawings

METHOD FOR THE SYNTHESIS OF POLYMERS, WHICH HAVE POLYURETHANE AND/OR POLYUREA GROUPS

FIELD OF INVENTION

The invention relates to a method for the synthesis of polymers having polyurethane and/or polyurea groups and containing finely divided fillers, by reacting compounds having at least two hydroxyl and/or amino groups, with at least difunctional isocyanates, optionally in the presence of catalysts, and mixing with suitable fillers.

BACKGROUND INFORMATION AND PRIOR ART

The synthesis of polyureas by the polyaddition reaction of diisocyanates or polyisocyanates with amines in the absence of solvents frequently presents difficulties. One reason for this lies in the high reactivity of the starting materials, which frequently react with one another readily upon being mixed. However, good mixing is a prerequisite for achieving a uniform reaction. Such mixing becomes difficult when, because of different equivalent weights, the volumes to be mixed are different and/or the viscosity of one of the reactants is relatively high. If the functionality of the reactants is high, so that the reaction results in highly viscous or solid products with high cross linking densities, the further processing of the reaction mixture and/or the dissipation of the heat of reaction is difficult. In every case, the starting materials must be stored separately and can be mixed only immediately before they are reacted with one another.

Similar problems arise with the solvent-free synthesis of polyurethanes from diisocyanates or polyisocyanates and glycols or polyols, such as polyetherols or polyesterols.

During the synthesis of molded polyurea or polyurethane objects by the casting method, these difficulties can lead to inhomogeneities due to different temperatures between the edge phase and the core, to the formation of bubbles and cracks due to overheating in the interior, to insufficient bonding of soft and hard segments due to the great differences in the reactivities of individual components and to side reactions and decomposition reactions.

It is also possible to carry out the reaction of the isocyanates with the polyethers, polyesters, polyamine or similar reactive compounds with active hydrogen atoms directly in the injection molding machine, in a reaction kneader or in a reaction extruder. If the viscosities of the reactants and/or of the polymers formed are high, metering out, mixing and transporting the reacting mixture or the polymers obtained create difficulties or make the use of this method impossible.

The present invention is concerned with the technical problem of the solvent-free synthesis of such polyaddition products with avoidance of the aforementioned difficulties. More particularly, it is concerned with the problem of metering out and mixing the starting materials uniformly and with reacting the starting materials, which frequently react spontaneously, in a controlled manner with one another. In this manner, homogeneous products are obtained, while temperature, which can cause side reactions or decomposition reactions is avoided. These mixtures of the reactants can be stored without any reactions worth mentioning taking place among the reactants.

OBJECT OF THE INVENTION

An object of the invention is a method for the synthesis and polymers having polyurethane, polyurea or both groups and containing finely divided fillers by reacting compounds having at least two hydroxyl, amino or both groups with at least difunctional isocyanates and mixing with fillers. The method can be optionally carried out in the presence of a catalyst.

SUMMARY OF THE INVENTION

Pursuant to the invention, this is accomplished by a method, which is characterized owing to the fact that:
  a) the compounds, containing hydroxyl and/or amino groups, and the isocyanates, at a temperature at which they are present in liquid form, are separately mixed intimately with finely divided solids in such amounts, that flowable powders are obtained;
  b) The powders obtained are mixed in the stoichiometrically required amounts; and
  c) the powder mixture is subjected to the action of shear forces at, if necessary, a higher temperature.

The objective of step a) of the method is the preparation of flowable "dry" powders, which in each case contain one of the reactants. For a typical procedure, the required amount of starting material, which is to be absorbed by the filler, is incorporated slowly into the filler with low-shear stirring.

Suitable fillers are finely-divided oxides of Mg, Ca, Ba, Al, Si, Ti or Zr and carbonates or sulfates of Ca or Ba, all having a high surface area. The oxides of silicon and aluminum are preferred and particularly suitable.

In general, the use of pyrogenic or precipitated silica, particularly silica with a BET surface area of about 50 to 400 $m^2/g$, is particularly preferred. Depending on the reactant to be absorbed, the use of silica, hydrophobized by known methods, may be advantageous. The hydrophobization can be carried out with a monomeric or polymeric organosilicon substance.

In some cases, the use of carbon black, activated charcoal or expanded clay is also possible. Activated charcoal is used in the form of a high-surface area, finely divided granulate. The same is true for the expanded clay.

The optimum ratio of starting compound to filler for adjusting the flowability and for carrying out the reaction can be determined easily by a preliminary experiment. Preferably, the ratio by weight of the starting material to the filler is about 95:5 to 60:40. At the same time, it is of course possible to add the catalyst, required for carrying out the reaction, to one of the reactants, preferably the compound with the active hydrogen atoms.

To synthesize the desired polyaddition product, the mixtures of filler and the respective starting material, obtained in step b) of the method, are mixed in the stoichiometrically required amounts. The powder mixtures can be stored at room temperature for practically an unlimited time without any observable reaction between the isocyanate and the reactant that has active hydrogens.

To carry out the reaction, the powder mixture is subjected pursuant to step c) of the method to the action of shear forces, the magnitude of which depends on the filler content. In the simplest case, the powder mixture is supplied to the inlet gap of a roller kneading machine.

After passage through the rollers, a coherent sheet of the desired polymers is obtained, which is transparent to opaque, depending on the nature and amount of filler. If finely divided silica is used, transparent sheets are usually obtained, which can be processed further in a suitable manner. For most applications, the filler contained does not interfere, since such polymers are in any case mixed with fillers when used.

The reaction can take place at room temperature or carried out at elevated temperatures by heating the rolling mill. Instead of a roll mill, it is also possible to use a kneader or an extruder.

The following reaction equations show typical examples of embodiments of the inventive method.

groups are used, which preferably are liquid at room temperature or melt without decomposition at temperatures up to 250° C.

Examples of such compounds are polyols, such as hydroxy-terminated polyethers or polyesters, particularly those with an average molecular weight of 400 to 100,000. Furthermore suitable are polyether esters or polyester ethers, which are obtained by the alkoxylation of carboxylic acids or polyesters or by the condensation of polyethers with multifunctional carboxylic acids. The starting material for the synthesis of the polyethers, in particular, is 1,2-propylene oxide. A further important alkylene oxide is ethylene oxide. However, epoxides with longer hydrocarbon chains can also be used.

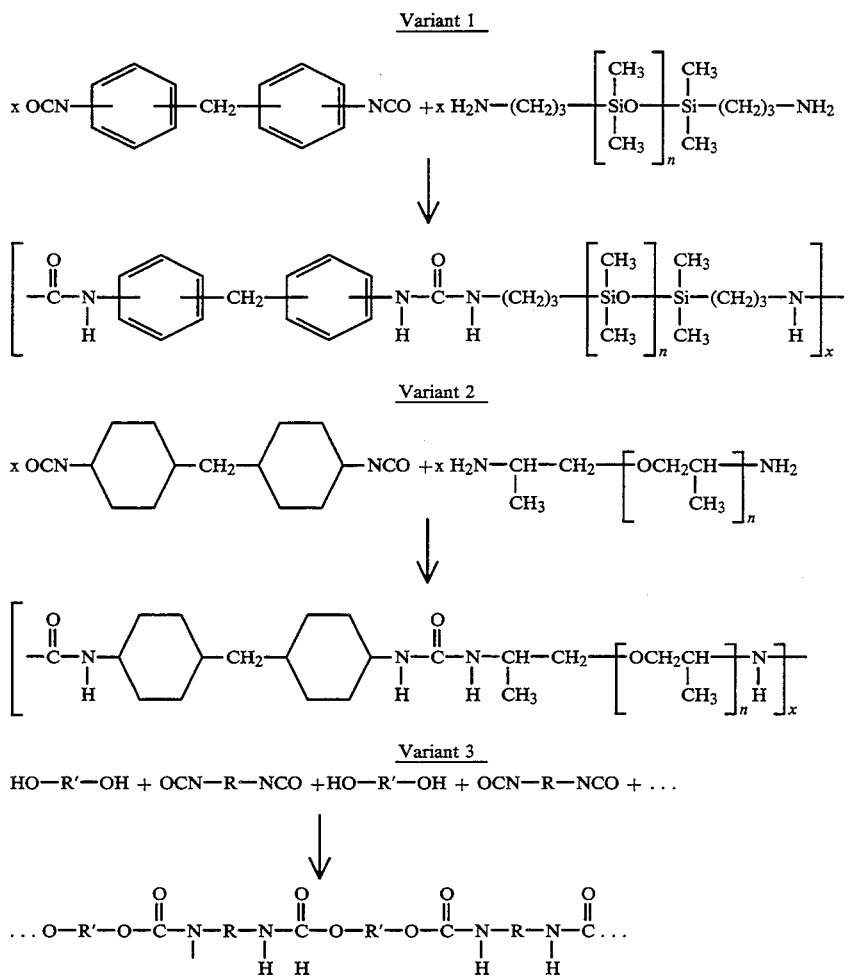

wherein HO—R'—OH is a polyether glycol, polyester glycol, α, ω-hydroxyalkyl polysiloxanes, etc.

As isocyanates, the usual compounds, known from the art, can be used. Preferably, aliphatic or aromatic diisocyanates or polyisocyanates, which are liquid at room temperature or melt without decomposition at temperatures up to 250° C., are used as isocyanates. Examples of preferred isocyanates are isophorone diisocyanate, hexamethylene diisocyanate, dicyclohexylmethane-4,4'-diisocyanate, diphenylmethane-4-4'-diisocyanate or toluylene 2,4/2,6-diisocyanate.

As reactants for the isocyanate, preferably aliphatic or aromatic glycols or polyalcohols, aliphatic or aromatic diamines or polyamine, aminoalcohols or polysiloxanes with at least two or more hydroxyl or amino Polyesters can be synthesized by the polycondensation of multifunctional carboxylic acids with multifunctional hydroxyl compounds. Further possibilities for synthesizing exist in the polycondensation of hydroxycarboxylic acids, the polymerization of ring esters (lactones), the polyaddition reaction between anhydrides of polycarboxylic acids and epoxides and the reaction of acid chlorides with alkali salts of hydroxyl compounds.

Examples of suitable diamines or polyamine are piperazine, bis(4-aminocyclohexyl)methane, 1,5-diamino-2,2-dimethyl-propane, 1-amino-3-aminomethyl-3,5,5-trimethylcyclohexane, 1,3-phenylenediamine, hexamethylenediamine, α, ω-diaminoorganopolysiloxane, polyetheramines and 2,2,4/2,4,4-trimethylhexamethylenediamine.

Catalysts, such as tertiary amines, tin octoate or dibutyl tin dilaurate, which are known as catalysts for such reactions, can be used. In the following examples, the inventive method is explained in greater detail and the properties of the polymers obtained are described. It should be understood that the examples are given by way of illustration and not by way of limitation.

1. Synthesis of polysiloxane ureas from α, ω-aminosiloxanes and isocyanates corresponding to the reaction After the powder is transferred to the roller, a coherent, sheeted-out compound is formed after 30 seconds and can be reversed in the further course of the rolling. When the rolling is commenced, heat is supplied to continue the reaction. After a temperature of 100° C. is reached in 15 minutes, the temperature is lowered and, after a further 15 minutes, the sheeted-out compound is taken off at a temperature of about 40° C.

A rubber-like, almost transparent sheet is obtained, which is not tacky. To complete the reaction, the sheet is tempered or stored for some days.

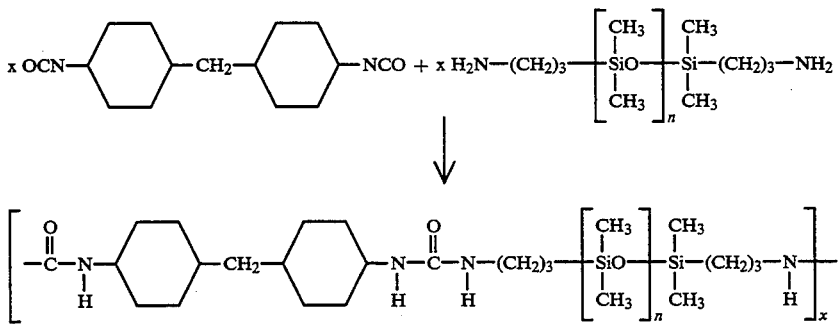

EXAMPLE 1

The following powder batches are prepared:
Batch A

Pyrogenic hydrophobic silica (30 g), with a BET surface area of $110\pm20$ m$^2$/g, commercially obtainable under the name of Aerosil R972, is added to a simple kitchen-type mixer. During a period of about 15 minutes, 60 g of aminosiloxane (with an Si number of 230 and an NH$_2$ equivalent of 8750) of the general formula

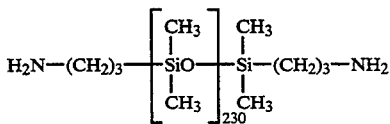

is added dropwise uniformly with uniform stirring. A finely grained, flowable powder results.

Batch B

As described above, 60 g of dicyclohexylmethane-4,4'-diisocyanate (NCO equivalent of 132) is mixed with 30 g of the silica described above. Once again, a finely grained, flowable powder results.

Batch A (100.0 g) and 1.5 g of Batch B are now mixed and homogenized by shaking. After 8 weeks of storage in an open or closed container at room temperature, this powder mixture is optically unchanged and continues to be flowable. After 8 weeks of storage at 50° C., the mixture is slightly yellow, but continues to be flowable.

The mixture is now added to a double roller and rolled under the following conditions:

| | |
|---|---|
| Temperature | room temperature to 100° C. |
| RPM | 33 |
| Friction | 1.2 |
| Gap Width | 0.2 mm |
| Time | 30 minutes |

EXAMPLE 2

The following powder batches are prepared:
Batch A

Pyrogenic hydrophobic silica (30 g), with a BET surface area of $110\pm20$ m$^2$/g, commercially obtainable under the name of Aerosil R972, is added to a simple kitchen-type mixer. During a period of about 15 minutes, 60 g of the aminosiloxane corresponding to that of Example 1 is added dropwise uniformly with uniform stirring. A finely grained, flowable powder results.

Batch B

As described above, 60 g of isophorone diisocyanate (NCO equivalent of 111) is mixed with 30 g of the silica described above. Once again, a finely grained, flowable powder results.

Batch A (100.0 g) and 1.3 g of Batch B are now mixed and homogenized by shaking.

As in Example 1, an almost transparent, tack-free elastomeric sheet is obtained by transferring the mixture to a double roller.

EXAMPLE 3

The following powder batches are prepared:
Batch A

Pyrogenic hydrophobic silica (30 g), with a BET surface area of $110\pm20$ m$^2$/g, commercially obtainable under the name of Aerosil R972, is added to a simple kitchen-type mixer. During a period of about 15 minutes, 60 g of aminosiloxane (with an Si number of 15 and an NH$_2$ equivalent of 621) of the general formula

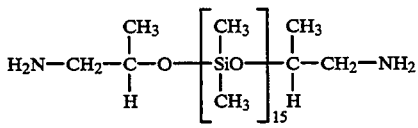

is added dropwise uniformly with uniform stirring. A finely grained, flowable powder results.

Batch B

As described above, 60 g of isophorone diisocyanate (NCO equivalent of 111) is mixed with 30 g of the silica described above. Once again, a finely grained, flowable powder results. Batch A (100.0 g) and 15.8 g of Batch B are now mixed and homogenized by shaking.

As in Example 1, a tack-free, elastomeric sheet with better mechanical properties and a higher transparency than those of Examples 1 or 2, is obtained by transferring the mixture to a double roller.

The mixtures of Batches A and B can also be processed on an extruder with good results.

2. Synthesis of polyoxyalkylene ureas from oxyalkyleneamines and isocyanates according to the reaction prepared from 100.0 g of Batch A, 34.8 g of Batch B, and 90.4 g of Batch C.

The mixture is transferred to a double roller and rolled under the following conditions:

| Temperature | room temperature |
|---|---|
| RPM | 33 |
| Friction | 1.2 |
| Gap Width | 0.2 mm |
| Time | 10 minutes |

After the powder is transferred to the rollers, a coherent sheeted-out compound, which can be reversed in

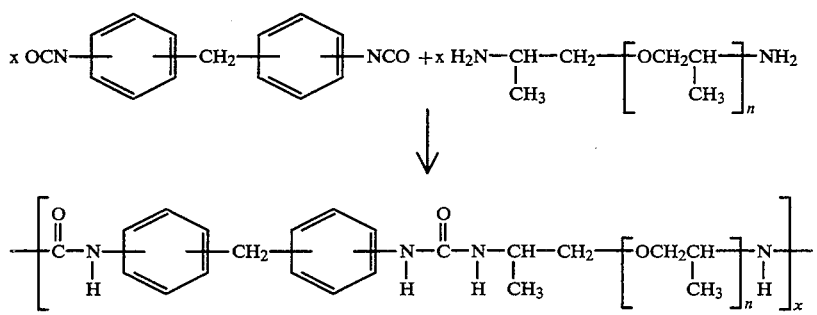

EXAMPLE 4

The following powder batches are prepared:
Batch A
Precipitated silica (30 g), with a BET surface area of 100 m²/g, is added to a simple kitchen-type mixer.

the further course of the rolling, is formed after about 30 seconds.

A translucent product with good mechanical properties is obtained.

3. Synthesis of polyurethanes from polyols and isocyanates corresponding to the reaction

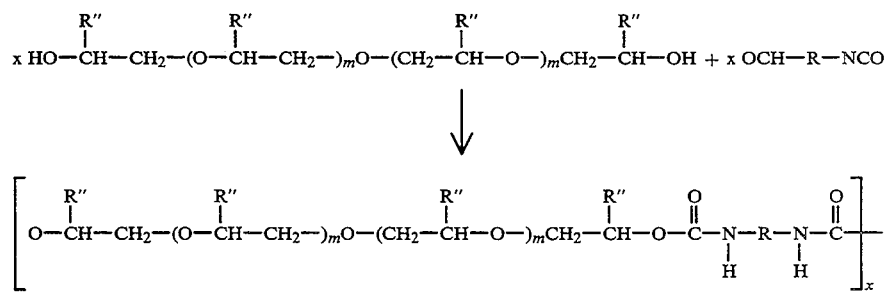

Within a period of about 15 minutes, 60 g of oxyalkylenediamine of the general formula

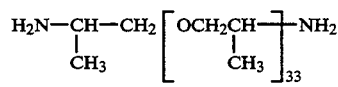

with an NH₂ equivalent of 1000, is added uniformly while stirring uniformly. A finely grained, flowable powder results.
Batch B
As described above, 60 g of diethyltoluenediamine, with an NH₂ equivalent of 89, is mixed with 30 g of precipitated silica that has a BET surface area of 100 m²/g. Once again, a finely grained, flowable powder results.
Batch C
Diphenylmethane diisocyanate (60 g) (NCO equivalent of 183), is mixed with 30 g of precipitated silica with a BET surface area of 100 m²/g. A mixture is

EXAMPLE 5

The following powder batches are prepared:
Batch A
Pyrogenic silica (25 g) with a BET surface area of 200±25 m²/g (obtainable commercially under the name of Aerosil 200) is added to a simple kitchen-type mixer. Within a period of about 15 minutes, 75 g of a polyether of the general formula

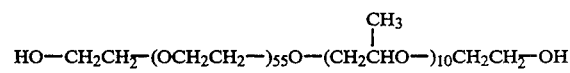

with an OH equivalent of 1560 (commercially obtainable under the name of Voranol EP 1900), is added uniformly while stirring uniformly. A finely grained, flowable powder results.
Batch B
As described above, 75 g of a polyethertriol having the formula

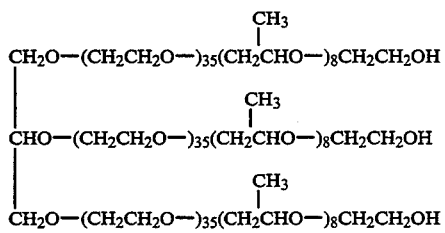

with an OH equivalent of 2000, commercially available under the name of Desmophen E 7963, is added uniformly to 25 g of the aforementioned silica. A finely grained flowable powder results.

Batch C

As described above, 75 g of 1,4-butylene glycol are added uniformly to 25 g of the aforementioned silica. A finely grained flowable powder results.

Batch D

Diphenylmethane diisocyanate (75 g) with an NCO equivalent of 168, is added to 25 g of the aforementioned silica.

Batch E

Triethylenediamine (75 g) is mixed with 25 g of the aforementioned silica.

Batch F

The aminosiloxane used in Example 1 (75 g), with an amine equivalent of 8750, is mixed with 25 g of the aforementioned silica.

A mixture is formed from 40.0 g of Batch A, 40.0 g of Batch B, 8.0 g of Batch C, 37.6 g of Batch D, and 0.8 g of Batch E and transferred to a roll mill of Example 1. A sheeted-out compound is obtained immediately and heated over a period of 15 minutes to 100° C. and then cooled within 15 minutes to 40° C. The plastic sheet, removed from the roll mill, shows good mechanical properties.

EXAMPLE 6

As in Example 5, a mixture is prepared from
40.0 g of Batch A,
40.0 g of Batch B,
8.0 g of Batch C,
37.7 g of Batch D,
8.0 g of Batch F, and
0.8 g of Batch E and transferred to a roll mill of Example 1. A sheeted-out compound results immediately and is heated within 15 minutes to 100° C. and then cooled within 15 minutes to 40° C. The plastic sheet taken off has better mechanical properties than the product of Example 5.

EXAMPLE 7

The following powder batches are prepared:

Batch A

Pigment carbon black (30 g), heated to a temperature of 100° C., is added to a simple mixer. Within about 1 minute and while stirring uniformly, 70 g of oxyalkylenediamine of the general formula

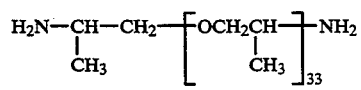

with an NH₂ equivalent of 1000, which has been heated to about 70° C., is added. A flowable powder results.

Batch B

As described above, 70 g of diphenylmethane diisocyanate, with an NCO equivalent weight of 183, is mixed with 30 g of carbon black as above. A flowable powder is formed once again.

A mixture is formed from 100.0 g of powder mixture A and 18.2 g of powder mixture B.

The mixture is transferred to a double roller and rolled under the following conditions:

| Temperature | 80° C. |
| --- | --- |
| RPM | 33 |
| Friction | 1.2 |
| Gap Width | 0.2 mm |
| Time | 3 minutes |

After the powder is transferred to the rollers, a coherent sheeted-out compound is obtained after about 1 minute.

EXAMPLE 8

Batch A

Titanium dioxide (80 g) (commercially obtainable under the name of Sachtolen R 301) is added to a mixer and 20 g of polyesterol, with an OH number of 51.6, is added at a temperature of 80° C. while stirring uniformly. A flowable powder is obtained.

Batch B 1,4-Butylene glycol (70 parts by weight) and 30 parts by weight of pyrogenic silica are mixed at room temperature. A fine powder results.

Batch C

Pure 4,4'-diphenylmethane diisocyanate (70 g) is introduced into 30 g of pyrogenic silica under the conditions given for Batch A. A flowable powder is formed.

A mixture is formed from 100.0 g of Batch A, 3.7g of Batch B, and 13.3 g of Batch C, and transferred to a double roller. It is heated for 15 minutes to 120° C. and cooled within 15 minutes to 40° C. A highly filled polyurethane sheet results.

The material obtained can be transformed into the granulate form and used as a white color master batch for coloring thermoplastic polyurethane elastomers.

EXAMPLE 9

Batch A

Aminosiloxane (20 g) with an Si number of 30 and an amine equivalent of 1170, is stirred by mixer into 80 g of micronized titanium dioxide, commercially obtainable under the name of Hombitec. A flowable powder results.

Batch B

A fine powder, consisting of 70 g of dicyclohexylmethane-4,4'-diisocyanate, with an NCO equivalent of 132, and 30 g of pyrogenic silica, is prepared by mixing.

A powder mixture is prepared from 200.0 g of Batch A and 6.5 g of Batch B. After the mixture is transferred to a double roller, a sheeted-out compound from a polysiloxane urea matrix, highly filled with titanium dioxide, is obtained spontaneously.

The material is suitable as a master batch for coloring thermoplastic materials. Special processing properties, such as improved dispersability of the pigment, improved sliding effect, improved release action and an effect on the melting are achieved at the same time due to the presence of the silicone polymer matrix.

We claim:

1. A method for the synthesis of polymers having polyurethane, polyurea or both groups and containing finely divided fillers, by reacting compounds having at least two hydroxyl, amino or both groups, with at least difunctional isocyanates, optionally in presence of a catalyst, and mixing with fillers, comprising the steps of:
   a) separately mixing intimately the compounds having hydroxyl, amino or both groups, and the isocyanates, at a temperature at which they are present in liquid form, with a finely divided solid in such an amount that flowable powders are obtained;
   b) mixing the powders obtained in a stoichiometrically required amount; and
   c) applying shear forces to the powder mixture thus obtained at room or a higher temperature.

2. The method of claim 1, comprising that finely divided solid is a member selected from the group consisting of high surface area oxides of Mg, Ca, Ba, Al, Si, Ti or Zr, carbonates or sulfates of Ca or Ba, activated charcoal and expanded clay.

3. The method of claim 2, further comprising that pyrogenic or precipitated silica is used as the finely divided solid.

4. The method of claims 2 or 3, further comprising that silica with a hydrophobized surface is used as the solid.

5. The method of claims 2 or 3, further comprising that silica with a specific BET surface area of about 50 to 400 m$^2$/g is used as the solid.

6. The method of claims 1 or 2, comprising that the starting materials (A) comprising compounds having hydroxyl, amino or both groups and the isocynates are in each case mixed with the finely divided solids (B) in a weight ratio of A:B of 95:5 to 60:40.

7. The method of claims 1 or 2, comprising that aliphatic or aromatic polyols, aliphatic or aromatic polyamines, aminoalcohols or polysiloxanes with at least two or more hydroxyl or amino groups, which are liquid at room temperature or melt without decomposition at temperatures up to 250° C., are used as the compounds having hydroxyl, amino or both groups as reaction partners for the isocyanate.

8. The method of claims 1 or 2, comprising that aliphatic or aromatic polyisocyanates, liquid at room temperature or melting without decomposition at temperatures up to 250° C., are used as isocyanates.

9. The method of claim 8, comprising that the isocyanate is a member of the group consisting of isophorone diisocyanate, hexamethylene diisocyanate, dicyclohexylmethane-4,4'-diisocyanate, diphenylmethane-4,4'-diisocyanate and toluylene-2,4/2,6-diisocyanate.

10. The method of claims 1 or 2, comprising that a catalyst, which accelerates the reaction in which polyureas or polyurethanes are formed, is mixed together with the alcohol or amine component.

11. The method of claims 1 or 2, comprising that the reaction mixture is exposed to the action of shear forces by treatment in a double roller, a kneader or an injection molding machine in step c) of the method.

* * * * *